United States Patent [19]

Ng et al.

[11] Patent Number: 4,916,561
[45] Date of Patent: Apr. 10, 1990

[54] HARD COPY PRINTER HAVING MAGNETIC TAPE IMAGE STORAGE

[75] Inventors: Yee S. Ng, Fairport; Eric K. Zeise, Pittsford, both of N.Y.

[73] Assignee: Eastman Kodak Company, Rochester, N.Y.

[21] Appl. No.: 246,599

[22] Filed: Sep. 20, 1988

[51] Int. Cl.⁴ ............................................. G11B 15/48
[52] U.S. Cl. .................................. 360/74.1; 355/202
[58] Field of Search ..................... 355/202; 358/256; 360/63, 74.1

[56] References Cited

U.S. PATENT DOCUMENTS

| | | | |
|---|---|---|---|
| 3,539,734 | 11/1970 | Tsuchiya | 179/100.2 |
| 4,237,497 | 12/1980 | Trevithick | 360/72.1 |
| 4,298,269 | 11/1981 | Yoshimaru et al. | 355/3 R |
| 4,414,593 | 11/1983 | Miller et al. | 360/102 |
| 4,586,094 | 4/1986 | Chambors et al. | 360/77 |
| 4,655,577 | 4/1987 | Ikuta | 355/3 R |

Primary Examiner—Vincent P. Canney
Attorney, Agent, or Firm—J. R. Hanway

[57] ABSTRACT

Streaming magnetic tape system used as an electronic recirculating feeder for copiers and printers. Scanned and digitized original pages are stored on tape by high speed thin film parallel heads. The tape is reversed and the heads are shifted after one-half of the pages are stored on the tape. Storage of the second half of the pages results in the tape being back at the place of beginning, thus eliminating time-consuming rewinds. In one embodiment, the pages are counted before recording to ascertain the middle tape reversal location.

13 Claims, 2 Drawing Sheets

HARD COPY PRINTER HAVING MAGNETIC TAPE IMAGE STORAGE

BACKGROUND OF THE INVENTION

1. Field of the Invention

This invention relates, in general, to hard copy printers and, more specifically, to electrophotographic copiers, duplicators, and printers suitable for copying multipage documents.

2. Description of the Prior Art

Devices which produce hard paper copies of text, graphics, and/or pictorial images are generally referred to a copies, duplicators, or printers. Such devices, referred to herein generally as printers, are often required to print several copies of a multi-page document. In order to print several copies of a multi-page document the image on each page must be transferred to the printer several times. This requirement often means that the complete stack of pages must be scanned once for each copy desired.

One method used in the prior art to print multi-page documents is to recirculate the originals through an optical scanner each time the page is to be printed. While this arrangement has been successful in the past, two primary disadvantages to such a system exist. First, mechanically transferring the originals through a scanner many times can cause deterioration of the original and increase the probability of the paper path being jammed. Second, the time it takes to physically move the originals through the image scanner is becoming a limiting factor in the through-put or overall speed of the printer.

Some prior art printers use electronic scanning to solve these problems. With electronic scanning, a digitized image of each page is stored in a digital memory bank. When each page is to be printed, the printer's controller obtains the digital image from memory rather then directly from the original. The main drawback to the memory system is the size of the memory required for large documents. Digitized information requires considerable memory space and efforts to compress digital image data have not fully solved the massive memory requirements.

It is not uncommon that the printer must have the capability of making several copies of a 50-page document. Compression techniques applied to printers work satisfactorily for text and most graphics, giving a compression ratio of about 30 to 1. Pictorial images, or pictures, generally require different, more complex, compression techniques than those used for text and graphics. Often, pictures require less memory space when no compression is attempted. Assuming 50 pages with 20 percent picture content, a resolution of 400 dpi (dots per inch), and 8½ by 11 inch paper, approximately 21 Mbyte of memory would be required to store the digital images for all 50 pages. This approximation does not consider the possibility that much more memory would be needed if the originals contained more than 20 percent pictorial information.

Solid state memory, such as DRAM and CMOS RAM, is relatively expensive in such quantities. Winchester hard disk drives capable of the required bit transfer rate are also expensive. Streaming, or conventional linear motion, tape systems may be cost effective, but traditionally are too slow for this application. Even considering the availability of streaming tape systems having sufficient speed to record and playback the digital data, there is a further problem of the time necessary to rewind the recorded tape to start reading the data for another set of printed pages. Since the streaming tape system operates with a fast tape speed during recording to achieve a high bit rate, a considerable length of tape must be rewound to obtain the data for another set of prints. Typically, several seconds would be required and such an amount of time significantly detracts from the overall through-put of the printing system.

Therefore, it is desirable, and it is an object of this invention to provide a magnetic storage system for a multi-page printer which can handle the data rates necessary for good reproduction of the original. It is also desirable, and it is another object of this invention, to provide a storage system wherein the time delay caused by tape rewind is considerably reduced.

SUMMARY OF THE INVENTION

There is disclosed herein a new and useful system and method for making multiple copies of a multi-page document. The system includes a reversible tape system which stores the digital image data from the original pages in such a manner that rewinding a considerable length of tape to make additional copies of the document is not required. According to the invention, the original pages of the document to be copied or printed is scanned and digitized to provide digital data to a reversible tape system. The tape system includes high speed thin film parallel heads which can be moved transversely with respect to the movement of the tape. The tape system is controlled by a microprocessor controller which has been previously given information about the number of sheets in the document. The digital data is stored on the magnetic tape beginning with the first page of the document and sequentially until the data from the middle page of the document is recorded. Once recorded, the head is indexed or moved transversely one-half track and the magnetic tape is reversed in direction.

The second half of the original pages are recorded on the magnetic tape in the other direction so that when the last page is recorded, the tape is back at the position where the first page was recorded. To provide the data to the printhead, electrophotographic transfer process, or any other means suitable for making a hard copy, the recording head is indexed back to the original position and the direction of the tape is changed to the original direction. Thus, the recorded digital data representing the page images is read from the magnetic tape and transferred, through a buffer if needed, to the printing mechanism. Each time an additional copy of the original document is needed, the process is repeated without the delay of rewinding the magnetic tape from the end page to the beginning page of a long document.

In another embodiment of the invention, the digitized data is fed into an intermediate sequential tape system which stores the page data in sequential form along the entire length of the tape. The tape is then reversed and rewound to the beginning position. The originally recorded information is read from this tape and recorded on a reversible tape system similar to that disclosed in the other embodiment of the invention. The digital data needed to make the hard copies is supplied by the reversible tape system also as preciously described. In this second embodiment, the initial scanning and digitizing of the pages of the document also provides the means for counting the number of pages in the document. The number of pages is necessary when transferring the data between the two magnetic tape devices since the reversible tape system must reverse direction when approximately half of the pages have been transferred thereto.

The high speed tape head includes a plurality of individual read-write heads mounted on a common assembly which can be moved laterally to change the azimuth of the heads with respect to the motion of the tape. The azimuth is changed when the tape is recording in the opposite direction so that the tracks recorded in the first direction are not overwritten. The multiple heads provide the increased speed capability of the recording system and permit the use of such apparatus in connection with high speed duplicators, copiers, and printers.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
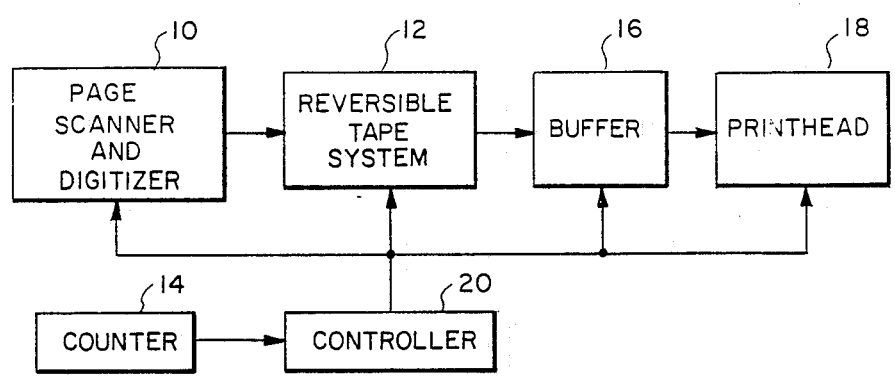
FIG. 1 is a block diagram of a multi-page printer system constructed according to one embodiment of the invention.

Throughout the following description, similar reference characters refer to similar elements or members in all of the Figures of the drawing.

Referring now to the drawings, and to FIG. 1 in particular, there is shown a block diagram of a multi-page printer constructed according to one embodiment of this invention. It is assumed that the printing system is to print several copies of a multi-page document, or stack of separate pages which will be referred to as the original pages. The original pages are inserted into the page scanner and digitizer 10 which optically scans the content of each page and digitizes the page content to obtain data suitable for magnetic storage. Operation of the scanner and digitizer 10 is well-known by those skilled in the art and compression techniques may be employed to reduce the amount of data which must be stored.

The data from the digitizer 10 is applied to the reversible tape system 12 where it is stored. A detailed description of the tape storage apparatus and method is contained elsewhere in this description. Briefly, the tape system 12 used information from the counter 14, which can be set manually by the operator, to determine where the approximate middle of the multi-page document is located. The tape system 12 includes a reversible tape drive which records the date for the pages contained in the first half of the original document on one set of tracks, then reverses direction and records the original pages in the second half of the document in the other direction. Thus, when the last original page is digitized and recorded on the tape system 12, the tape is at the same place where the first original page was stored, therefore, it is not necessary to rewind the tape after the last page is stored, but merely reverse the tape direction to begin reading the first original page data.

The previous description is for an even number of original pages. For an odd number of original pages, the physical location of the tape in the last page is within a one-page distance from the first page, so rewinding by one page is done rather than rewinding through a multiple page document, as in the prior art. This one-page rewinding can be done during the interframe time of the printer.

Date read from the tape system 12 is transferred to the buffer 16 and then to the print head 18, or electrophotographic print engine, for printing. The size of the buffer 16, which may be random access solid state memory, depends upon the speed and synchronization of the tape system 12 and the printhead 18. In ideal cases, the buffer 16 can be very small or not required at all. The buffer 16, as well as the digitizer 10, the tape system 12, and the printhead 18, are all under the control of the controller 20, which can be a microprocessor suitably programmed to sequence the operation of the major printer elements shown in FIG. 1 in the manner described. It is emphasized that counter 14 may be replaced by a mechanical or electronic system for counting the number of original pages. The important requirement is that the controlled 20 knows approximately where the middle of the stack is located to determine when to reverse the tape system 12. In other words, even though the scanner and digitizers 10 can count the pages as it is operating, the embodiment of the invention shown in FIG. 1 needs to know where the middle page is located to permit efficient utilization of the tape system.

Figure 3:
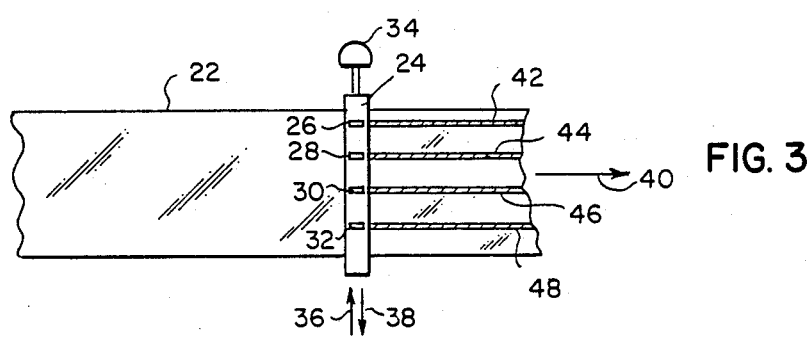
FIG. 3 is a view of a magnetic tape segment illustrating the head location and lateral movement.

A general illustration of the reversible tape system 12 of FIG. 1 is shown in FIG. 3. According to FIG. 3, the magnetic recording tape 22 is positioned adjacent to a read-write head assembly 24 which includes separate read-write heads 26, 28, 30 and 32. The head assembly 24 is constructed of the thin film type with multiple parallel heads operating simultaneously to increase the through-put or recording speed of the tape system. Although FIG. 3 shows a recoding head assembly having four separate heads, it is within the contemplation of this invention that more or less heads may be used. The head assembly 24 is connected to the stepping motor 34 for the purposes of moving the head assembly 24 in a lateral direction represented by the arrows 36 and 38. The stepping motor 34 could also be a solenoid or actuator which would be capable of moving the head assembly 24 in the lateral directions to change the azimuth of the head with respect to the tape 22. Although described as a movable head assembly, the recording and playback heads could have other configurations within the contemplation of the invention. For example, the heads could be permanently fixed into position with alternate or interleaved heads being selectively and independently accessed to use interleaved tracks when the tape is reversed.

Figure 4:
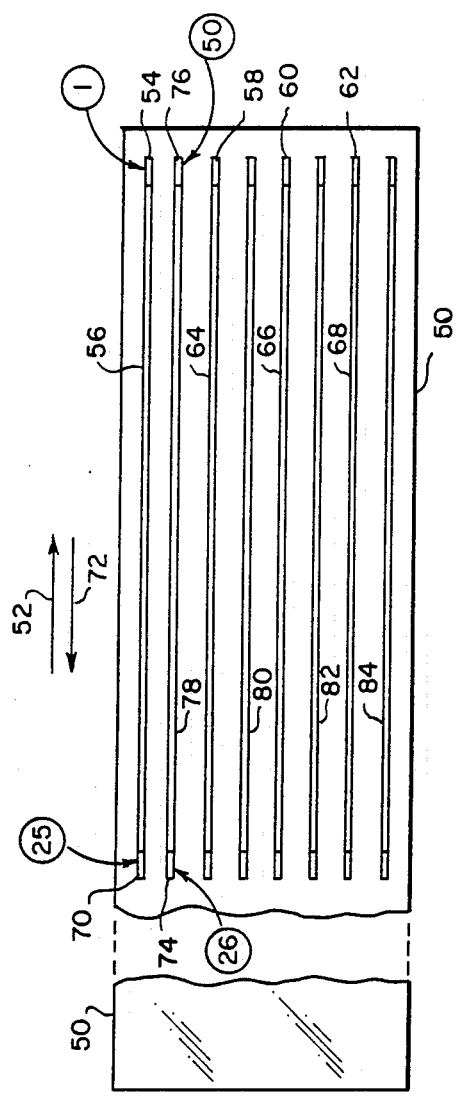
FIG. 4 is a view of a recorded tape segment produced by the reversible tape system shown in FIG. 1.

Assuming that the tape 22 moves in the direction 40 under the head assembly 24, the recorded data is contained in the tracks 42, 44, 46 and 48. While the actual content of the recorded tracks will be shown in more detail in FIG. 4, FIG. 3 illustrates the general location of the recorded tracks on the tape 22. Tape 22 is of the streaming, reel to reel, type having a fixed length determined primarily by the maximum number of original pages which the printer is capable of reproducing.

FIG. 4 illustrates, in detail, the recording tracks positioned on the tape used for the reversible tape system 12 in FIG. 1. Although the tape 50 of FIG. 4 is similar to the tape 22 of FIG. 3, it is illustrated with a fixed length and with intermediate tracks, which will be discussed later. The tracks on the tape 50 were produced by moving the tape across the recording head originally in the direction 52. Assuming a 50-page document, data representing the first page of the document, is recorded at segment 54 on track 56. Because of the parallel operation of the high speed head assembly, data corresponding to page 1 is also included at segments 58, 60 and 62 of tracks 64, 66 and 68, respectively, although these segments are not specifically identified in FIG. 4 as containing page 1 data. As the scanner is digitizing the page data and the tape 50 is moving in direction 52, page data is sequentially recorded on the tracks so that the segment adjacent to segment 54 would contain data for page 2 and progressively until the data for page 25 is recorded on segment 70. After page 25 data has been recorded, the tape 50 reverses direction and moves in the direction 72, and the tape head moves transversely one-half track, or an alternate set of heads are accessed if the head assembly is so constructed. Data continues to be recorded sequentially with data for page 26 being contained in segment 74 and data for the last page, page 50, contained in segment 76. It is pointed out that the parallel operation of the high speed heads provides corresponding data of the same pages on tracks 56, 64, 66 and 68, and on tracks 78, 80, 82 and 84.

As is shown in FIG. 4, the first half of the stack of original pages is recorded when the tape is moving in direction 52. Then, the head is moved and the tape 50 is reversed and moves in direction 72 to record the second half of the original pages. Thus, when the last page, page 50, is recorded, the head assembly will be positioned at a location along the tape 50 for reading data corresponding to page 1, simply by reversing the direction of the tape 50 and indexing or moving the head assembly laterally one-half track back to its original position.

The tape recording process for each of the 50 pages is performed once in the printing process. Reading the recorded tape information by moving the tape in both directions and indexing the heads through one complete cycle occurs for each copy of the multi-page document required. Because of the position of the tape and head relative to each other when data for the last page of the document is read, insignificant delay is produced when data for the first page of the document for the next copy is required.

A slight delay would be developed when there is an odd number of pages contained in the original document. This is because the length of the two tracks which are recorded in each direction would not be exactly the same. Depending upon the break for the change of direction determined by the controller of the system, there would be one less page recorded between the two bi-directional tracks. Utilizing a one-page buffer in the printer can eliminate the one-page date accessing time delay if such is a critical problem to the overall speed of the printer. However, in most applications, the delay caused by an odd number of pages should be easily tolerated. Synchronizing of the tape speed, readwrite head movement, and printhead speed can further increase the through-put of the printer by performing the tape reversal and head movement at times when the printhead is not requiring data because of its own timing overhead requirements. In the case where the printhead is effectively an electrophotographic printing device having an image loop, synchronization of the tape reversal and head movement with the frames on the image loop to make the movements during interframe time can also increase the through-put time of the printing apparatus.

Figure 2:
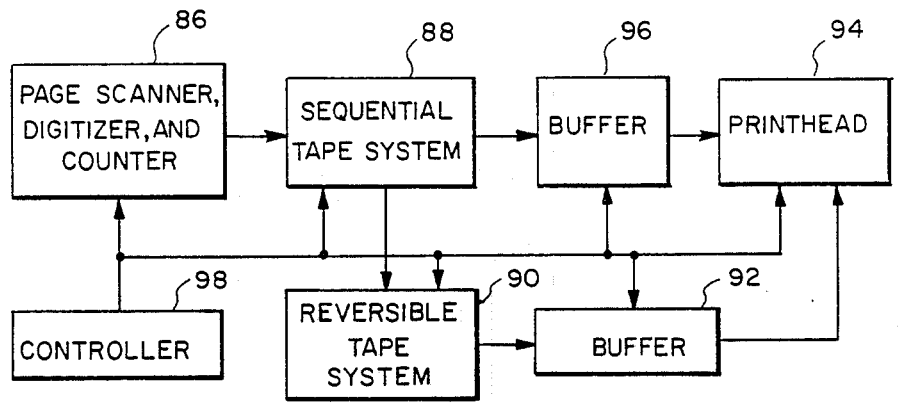
FIG. 2 is a block diagram of a multi-page printer system constructed according to another embodiment of the invention.

FIG. 2 illustrates, in block form, a multiple page printing system constructed according to another embodiment of the invention. In this embodiment, the printing system automatically determines the number of original pages in the document and, consequently, the place at which the reversible tape system should be reversed. According to FIG. 2, the original pages of the document are processed by the page scanner, digitizer, and counter 86. The scanning and digitizing operation is performed sequentially upon the pages of the original document with the data being transferred to the sequential tape system 88. The counting function of the counter 86 is not complete until all of the pages have been scanned and digitized and stored in the tape system 88. Therefore, the tape system 88 is not a reversible tape system as previously described, since the point at which the tape would be reversed is not yet known. A more complete description of the operation of the sequential tape system 88 is contained with the description of FIG. 5, included later herein.

The initially stored digital information for all of the pages of the original document is contained on the recording tape in the sequential tape system 88. After all of the pages are stored, the tape is rewound and its data is supplied to the reversible tape system 90 which operates in much the same fashion as the reversible tape system 12 of FIG. 1. Similarly, the buffer 92 and the printhead 94 provide the means for the data stored on the tape system 90 to be converted to a hard copy print. Buffer 96 is positioned in the data path between blocks 88 and 94 which indicates that one copy of the original document can be printed simultaneously with the initial scanning and digitizing of the image data for recording onto the tape system 88. Since the buffers 92 and 96 supply the printhead 94 which can only print one buffer's data at a time, a modification to the circuit would be to use one common buffer.

While there would be a delay between printing the first stack of copies and the second stack of copies equal substantially to the time required to rewind the tape in the tape system 88, the arrangement of FIG. 2 eliminates the need to manually, automatically, or otherwise count the pages in the original document before the scanning and digitizing process. However, after the first time delay, the through-put or speed of the printing process for subsequent copies of the original multi-page document would be similar to *the speed of the printing system shown in FIG. 1 since the reversible tape system 90 does not require full tape reversal and rewind between every copy of the document. Controller 98, which may be a suitably programmed microcomputer, coordinates the operation and timing of the various systems of the printer shown in FIG. 2.

Figure 5:
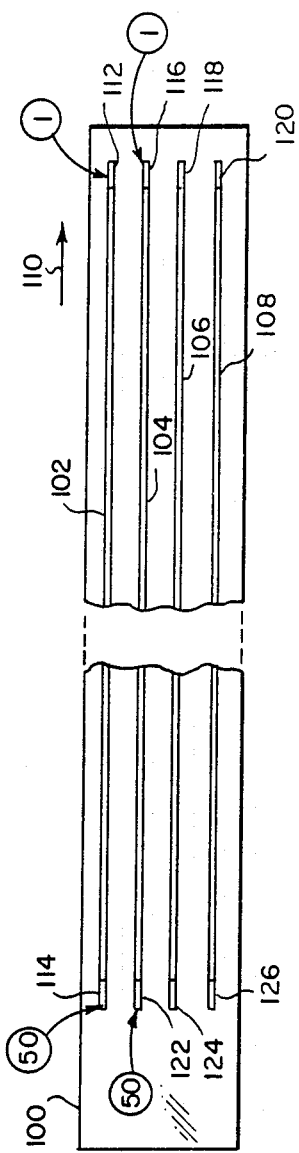
FIG. 5 is a view of a recorded tape segment produced by the sequential tape system shown in FIG. 2.

FIG. 5 illustrates the details of the recording tape used in the sequential tape system 88 of FIG. 2. According to FIG. 5, the tape 100 includes four recorded tracks in keeping with the four-head arrangement shown in FIG. 3, although other numbers of heads may be used to increase the speed of the recording process. Tracks 102, 104, 106 and 108 on tape 100 include information corresponding to the same pages in the original document.

Assuming that the tape was moving during the recording process in direction 110, the first page of the assumed 50-page document would be recorded at segment 112 on track 102. Succeeding pages would be recorded sequentially along track 102 until the last page, page 50, would be recorded at segment 114.

Because of the parallel nature of the recording tracks, data corresponding to page 1 would also be recorded at segments 116, 118 and 120, and data corresponding to page 50 would be recorded also at segments 122, 124 and 126. It is also within the contemplation of this invention that some of the tape tracks may contain address, direction, or control data for the other tracks of the tape drive. In effect, the tape 100 performs the function of storing the digitized data for transfer to the tape 50, in the FIG. 2 embodiment, when the counting operation is being performed. In other words, tape 100 is used in an intermediate process of digitizing and counting the pages until the system used on tape 50 can be implemented when the number of pages, and consequently the middle of the document, is determined. Tape 100 is also convenient for storing all of the pages digitally on a magnetic tape in easily readable form. In this respect, tape 100 could be a cartridge tape which could easily be removed from the printer to store or transfer the contents to other apparatus.

There has been disclosed herein apparatus and methods for storing digital page data in magnetic tape memory without the usual problems of tape rewind delays between the making of copies of the document. The disclosed invention accomplishes these results in a new and novel manner, and permits an increase in the through-put speed of copiers, duplicators, and printers using magnetic tape as a digital storage medium.

It is emphasized that numerous changes may be made in the above-described system without departing from the teachings of the invention. It is intended that all of the matter contained in the forgoing description, or shown in the accompanying drawings, shall be interpreted as illustrative rather than limiting.

We claim as our invention:

1. Hard copy printing apparatus having magnetic tape digital storage capabilities, said apparatus being operable to print multiple copies of a stack containing a plurality of pages, said apparatus comprising:

means for acquiring digital data representative of the image contained on each page of the stack, including beginning and ending pages and first and second adjacent pages near the middle of the stack, said first adjacent page being positioned in the stack closer to the beginning page than said second adjacent page;

means for determining the number of pages in the stack;

a reversible magnetic tape system having a tape of predetermined length and a head assembly;

means for recording the digital image data of said beginning page at a first location on the tape, of said first adjacent page at a second location, of said second adjacent page at a third location, and of said ending page at a fourth location, said first and second tape locations being on the same recording track, said third location being substantially at the same distance on the tape as said second location but on a different track, and said fourth location being substantially at the same distance on the tape as said first location but on the same track as said third location;

means for reading said tape tracks in the same order in which they were recorded; and means for sending the rad data to a means for printing.

2. The printing apparatus of claim 1 wherein the recording means reverses the tape and laterally shifts the head assembly after the first adjacent page is recorded at the second location on the tape.

3. The printing apparatus of claim 1 wherein the reading means laterally moves the head assembly and changes the direction of movement of the tape after the ending page is recorded at the fourth location on the tape.

4. The printing apparatus of claim 1 wherein the head assembly includes a plurality of separate recording heads operating in parallel to increase the recording speed.

5. The printing apparatus of claim 1 wherein the number determining means includes a counter which is manually set by the printer operator.

6. The printing apparatus of claim 1 wherein the speed of the magnetic tape system is synchronized with the means for printing, thereby permitting a reduction in buffer memory.

7. The printing apparatus of claim 1 wherein the means for acquiring digital data includes a second magnetic tape system which is operable to store digital image data directly from a scanning of all the pages in the stack, with the page image data being sequentially arranged on said second tape from the beginning to ending pages without tape reversal, said second tape system being operable to transfer the recorded data to the reversible magnetic tape system.

8. The printing apparatus of claim 1 wherein the tape of the magnetic tape system is of the non-endless type.

9. The printing apparatus of claim 1 wherein the head assembly is movable laterally with respect to the direction of movement of the magnetic tape.

10. Hard copy printing apparatus having magnetic tape digital storage capabilities, said apparatus being operable to print multiple copies of a stack containing a plurality of pages, said apparatus comprising:

means for scanning the pages in the stack, said scanning providing digital image data representative of the information on each page;

means for determining the number of pages in the stack;

a reversible magnetic tape system having a magnetic tape of predetermined length and a multiple-position high speed recording head movable laterally with respect to the direction of movement of the magnetic tape;

means for recording the image data from the pages substantially in the first half of the stack onto a plurality of tracks on the tape, with the recording starting with the first page and progressing sequentially as the tape is moved past the recording head;

means for reversing the tape when the first half of the pages have been recorded;

means for moving the heads laterally across the tape after the first half of the pages have been recorded;

means for recording the image data from the pages substantially in the second half of the stack onto a plurality of tracks on the tape, with the recording starting with the next page in the stack and progressing sequentially to the last page in the stack;

means for reversing the tape when the second half of the pages have been recorded;

means for moving the heads laterally back to the position used to record the first half of the pages;

means for reading the tape tracks in the same sequence in which they were recorded and for sending the read data to a means for printing; and means for repeating the reading process to provide the desired number of copies of each page.

11. A method of printing multiple copies of a stack containing a plurality of pages, said method comprising the steps of:

sequentially writing, to a plurality of tracks on a first magnetic tape, image data for substantially the first half of the stack;

reversing the direction of movement of the magnetic tape after the first half data writing;

sequentially writing, to the reversed tape and on different tracks, image data for substantially the second half of the stack;

changing the tape direction after the second half data writing;

reading data from the tape in the same sequence used for writing;

outputting the read data to a means for printing; and repeating the reading and outputting steps to provide the desired number of copies of each page.

12. The method of claim 11 including the steps of:

scanning the pages to be printed and storing the image data obtained by writing sequentially onto a second tape system without tape reversal;

obtaining from the scanning operation the number of pages in the stack;

rewinding said second tape; and reading the sequential data from said second tape to provide the image data which is written onto the first magnetic tape.

13. The method of claim 11 including the step of moving a head assembly laterally across the tape when the tape changes direction.

* * * * *